United States Patent Office 3,516,997
Patented June 23, 1970

3,516,997
3,7-DISUBSTITUTED CEPHALOSPORIN COMPOUNDS AND PREPARATION THEREOF
Tadayoshi Takano, Hirakata, Masaru Kurita, Takatsuki, Hiroo Nikaido, Ikeda, Masashi Mera, Amagasaki, Nobukiyo Konishi, Kyoto, and Ritsuko Nakagawa, Akashi, Japan, assignors to Fujisawa Pharmaceutical Co., Ltd., Osaka, Japan
No Drawing. Filed Apr. 12, 1968, Ser. No. 721,082
Claims priority, application Japan, Apr. 15, 1967, 42/23,971; Oct. 24, 1967, 42/68,429; Oct. 28, 1967, 42/69,510
Int. Cl. C07d 99/24, 99/10
U.S. Cl. 260—243    24 Claims

ABSTRACT OF THE DISCLOSURE

The 3,7-disubstituted cephalosporin compounds of this invention are novel 7-acylated amino-3-(thiolated methyl)ceph-3-em-4-carboxylic acids. They exhibit antibacterial activity against gram-positive and gram-negative bacteria.

---

This invention relates to novel 3,7 - disubstituted cephalosporin compounds and to process for the preparation thereof. More particularly, it is concerned with 7-acylamino - 3 - (thiolated methyl)ceph-3-em-4-carboxylic acids and the pharmaceutically aceptable salts thereof and with processes whereby they are produced.

The novel 3,7-disubstituted cephalosporin compounds of the invention exhibit broad spectrum antibacterial activity, and are useful as therapeutical agents in the treatment of infectious deseases caused by gram-negative and gram-positive bacteria. For such purpose, they may be administered either parenterally or orally.

The 3,7-disubstituted cephalosporin compounds of the invention can be represented by the following structural formula:

The term, "alkyl," and the alkyl radical part of the term, "alkoxy," can include a saturated straight, branched or cyclic monovalent hydrocarbon having from one to six carbon atoms, for example, as methyl, ethyl, propyl, isopropyl, butyl, tert.-butyl, cyclohexyl and the like.

The term, "aryl," and the aryl radical part of the term, "aralkyl," can include a monovalent aromatic ring, for example, as phenyl, naphthyl and the like which may bear halogen substituent.

The term, "alkylene," and the alkylene radical part of the term, "aralkyl," can include a saturated straight or branched divalent hydrocarbon having one to four carbon atoms, for example, as methylene, ethylene, propylene, methylmethylene, ethylmethylene, methylethylene, ethylethylene, 1-methylpropylene, 2-methylpropylene and the like.

The 3,7-disubstituted cephalosporin compounds of the invention can be prepared by treating a compound of the formula:

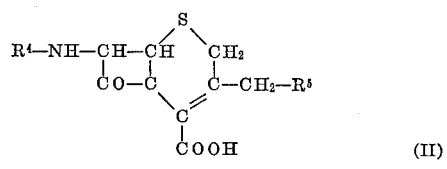

(II)

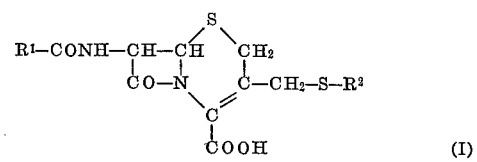

(I)

in which $R^1$ is a member selected from the group consisting of $R^3$— Alk)$m$— and $R^3$—S—(Alk)$m$— where $R^3$ is thienyl, diazolyl, triazolyl, tetrazolyl, thiazolyl, thiadiazolyl, thiatriazolyl, oxazolyl, oxadiazolyl, pyridyl, pyrimidinyl, benzothiazolyl, benzimidazolyl, benzoxazolyl or benzotriazolyl, $m$ is zero or one, and Alk is alkylene having a straight or branched chain, and $R^2$ is diazolyl, triazolyl, tetrazolyl, thiazolyl, thiadiazolyl, thiatriazolyl, oxazolyl, oxadiazolyl, benzimidazolyl, benzoxazolyl, triazolopyridyl or purinyl, and the pharmaceutically acceptable salts thereof.

In the above definition, the heterocyclic groups as represented by $R^2$ and $R^3$ may bear one or more substituents, for example, as halogen, amino, nitro, alkyl, alkoxy, aryl, aralkyl, furyl, thienyl, oxazolyl and the like.

The term "halogen," can include chlorine, bromine and the like.

In which $R^4$ is a member selected from the group consisting of

Hydrogen,
X—Alk—CO—,
$R^3$—(Alk)$m$—CO—, and
$R^3$—S—(Alk)$m$—CO wherein X is halogen, and $R^3$, $m$ and Alk have the same meaning as above, and $R^5$ is acetoxy or $R^2$—S—, wherein $R^2$ has the same meaning as above; provided that when $R^5$ is acetoxy, $R^4$ is X—Alk—CO—, $R^3$—(Alk)$m$—CO— or $R^3$—S—(Alk)$m$—CO—, and further provided that when $R^5$ is $R^2$—S—, $R^4$ is hydrogen or X—Alk—CO—, or a salt thereof with an appropriate thiol or a metallic salt thereof, or with an appropriate acid or a reactive derivative thereof.

By the thiol and the acid as described above and hereinafter means a mercapto compound having a formula: $R^2$—SH or $R^3$—SH and a hydroxycarbonyl compound having a formula: $R^3$—(Alk)$m$—COOH or $R^3$—S—(Alk)$m$—COOH, respectviely, wherein $R^2$, $R^3$, Alk and $m$ have the same meaning as above.

The reaction for the preparation of the object compounds of Formula I can be achieved by selecting the appropriate thiols or acids depending upon the characteristic nature of the starting compounds of Formula II to be used in the invention.

All the starting compounds to be used in the invention can be prepared by the treatment of Cephalosporin C, an antibiotic produced by Cephalosporium strains which are isolated from culture fluids, with appropriate reactants. For such purpose, there are a variety of methods for the preparation of the starting compounds.

One of the starting compounds of the invention, 7-acylated aminocephalosporanic acid can be obtained by hydrolysis of Cephalosporin C with formic acid and nitrosyl chloride and then by treatment of the resulting 7-aminocephalosporanic acid (7-ACA) with an acid or a reactive derivative thereof or further by the reaction of the resulting 7-haloacylated aminocephalosporanic acid with an appropriate thiol or its metallic salt in accordance with the substantially same procedure, for example, as described below under Preparation 1 to 3, inclusive.

BACKGROUND OF THE INVENTION

Alternatively, the other starting compounds of the invention, 3-thiolated cephalosporin derivatives, can be prepared by treating Cephalosporin C produced by the above methods with the appropriate thiols and by hydrolyzing the 3-thiolated cephalosporin C with formic acid and nitrosyl chloride according to the substantially same procedures, for example, as described below under Preparations 4 and 5. The resulting 3-thiolated 7–ACA can also be reacted with a haloacyl halide to obtain the 3-thiolated 7-haloacylated ACA to be used as a starting material by means of the substantially same procedures, for example, as described below under Preparation 6.

The 3-thiolated 7–ACA can also be obtained by reacting 7–ACA with the appropriate thiols in accordance with the substantially same methods, for example, as described below under Preparation 7.

As is shown above, all the starting compounds of the invention can be prepared by the substantially same techniques, for example, as described separately under Preparations. These starting materials also exhibit antibacterial activity against gram-positive and gram-negative bacteria and are useful agents in the treatment of infectious diseases caused thereby.

The starting compounds of the process of this invention are preferably employed as alkali metal salt which can be formed according to known procedures using an alkali metal bicarbonate, for example, as sodium bicarbonate, potassium bicarbnate and the like.

The starting compounds of Formula II, wherein $R^4$ is X—Alk—CO— and/or $R^5$ is acetoxy, are reacted with an appropriate thiol or a metallic salt thereof whereby they are converted into the desired object compounds of Formula I. In the above method, when the object compounds having the same heterocyclic group represented by $R^2$ and $R^3$ are desired, the appropriate thiols are used advantageously in more than two equimolar amounts to the starting materials. Otherwise, one equimolar amount of the thiol will be sufficient. The metallic salts of the thiols to be used preferably in this reaction can be prepared by the known methods using an alkali metal carbonate, e.g., sodium carbonate, an alkal metal bicarbonate, e.g., sodium bicarbonate, potassium bicarbonate, or an alkali metal hydroxide, e.g., potassium hydroxide, sodium hydroxide, and the like.

The above reaction is conducted in the presence of an inert solvent, e.g., acetone, dioxane, methanol, ethanol, tetrahydrofuran and the like or a mixture of such solvents or an aqueous solution of such solvents or water or buffers, e.g., borate, phosphate buffers and the like or any other suitable diluent. When such diluents are used, buffers can preferably be employed in the treatment of the thiols in a free form, whereby the thiols are transformed into a reactive form thereof. But the metallic salt of the thiols is reacted preferably in the presence of water or water-miscible organic solvents. Whenever the starting compounds are used as a free form, the reaction is carried out in the presence of a base, for example, as sodium bicarbonate, triethylamine and the like. The presence of such base also is preferred in the reaction between both the starting compounds either in a free form or in a salt form and the metallic salts of the thiols. The metallic salts of the thiols can be prepared by treating the free thiols with, for example, an alkali metal bicarbonate, e.g., sodium bicarbonate and the like, an alkali metal carbonate, e.g., sodium carbonate and the like, or an alkali metal hydroxide, e.g., sodium hydroxide, potassium hydroxide and the like. The reaction may also be accomplished at an elevated temperature under weakly acidic conditions, and, if necessary, under pressure and/or in the atmosphere of an inert gas, e.g., nitrogen. If advantageous results are obtained, the reaction conditions are not critical in temperature, pressure, pH value and the like.

The alternative starting compounds of Formula II, wherein $R^4$ is hydrogen, are reacted with an appropriate acid or a reactive derivative thereof to obtain the desired object compounds of Formula I. The reaction is carried out in the presence of an inert solvent, for example, as acetone, dioxane, acetonitrile, chloroform, methylene chloride, ethylene chloride, tetrahydrofuran, pyridine and the like or a mixture of such solvents or an aqueous solution of such solvents or water or any other suitable diluent. When the starting compounds of Formula II are employed as a free form, the reaction is effected in the presence of a base, for example, as sodium bicarbonate, sodium carbonate, triethylamine, triethanolamine and the like. Whenever the free acids are employed, the reaction is carried out in the presence of a condensing agent, for example, as N,N'-diethylcarbodiimide, N,N'-dipropylcarbodiimide, N,N'-diisobutylcarbodiimide, N,N'-dicyclohexylcarbodiimide, N - ethyl - N' - (4-ethylmorpholino)carbodiimide, N-cyclohexyl-N'-morpholinoethylcarbodiimide, N,N'-carbonyldi(2-methylindazole), pentamethyleneketene-N-cyclohexylimine, 1-ethoxy-1-chloroethylene, tetraethylphosphite, ethyl polyphosphate, N-ethyl-5-phenylisoxazolium-3'-sulfonate and the like. The presence of such condensing agents, however, is not necessary for the reaction, if the acids are otherwise. Under such circumstances, the acids are employed in a reactive form by the treatment with, for example, phosgene, thionyl chloride, oxalyl chloride, pivaloyl chloride, valeroyl chloride, isovaleroyl chloride, methane sulfonyl chloride, phosphorus oxychloride, phosphorus pentachloride, ethyl chlorocarbonate, isopropyl chlorocarbonate, isobutyl chlorocarbonate, N,N'-carbodi(imidazole) and the like. Further, the reaction is advantageously carried out at room temperature under weakly alkaline conditions, and, if necessary, under pressure and/or in the atmosphere of an inert gas, e.g., nitrogen. If the reactants are unduly susceptible to decomposition during the reaction, a lower temperature and/or anhydrous conditions can be employed advantageously. The other reaction conditions are not critical and are chosen depending upon the characteristic nature of the reactants.

After the reaction is substantially complete, the desired compounds of Formula I are recovered from the reaction mixture by the conventional techniques, for example, by evaporating the solvent from the reaction mixture or by adding water or by extracting wtih a water-immiscible solvent. The crude product can be further purified by conventional means, for example, as recrystallization, concurrent distribution, chromatography, thin layer chromatorgaphy, trituration and the like.

The desired compounds of Formula I are preferably converted for pharmaceutical purposes to the corresponding salts which can be prepared by the treatment with, for example, an alkali metal, e.g., sodium, potassium and the like, an amine, e.g., diphenylenediamine, dicyclohexylamine, dibenzylethylenediamine, triethylamine and the like.

The desired compounds of the Formula I may be used as medicaments in the form of pharmaceutical prepaartions, which contain the 3,7-disubstituted cephalosporin compounds or the salts thereof in admixture with a pharmaceutically acceptable organic or inorganic, solid or liquid carrier suitable for oral or parenteral administration. The pharmaceutical preparations may be in solid form such as capsules, tablets or dragees, or in liquid form such as solutions, suspensions or emulsions. If desired, there can be included in the above preparations auxiliary substances, for example, as preserving agents, stabilizing agents, wetting or emulsifying agents, salts for varying the osmotic pressures and buffers.

The following preparations and examples are illustrative of the invention, but it is to be understood they are not to be considered as limitative.

Preparation 1—7-(5-methyl-1H-tetrazol-1-yl)acetamidocephalosporanic acid

To a solution of 284 mg. of 5-methyl-1H-tetrazole-1-acetic acid and 242 mg. of triethylamine in 20 ml. of tetrahydrofuran cooled to −20° C. was added 240 mg. of pivaloyl chloride. After thirty-minute stirring of the mixture, 20 ml. of a chloroform solution containing 544 mg. of 7-aminocephalosporanic acid and 242 mg. of triethylamine was poured into the solution cooled at −10° C. durnig a period of 30 minutes. The resulting mixed solution was stirred for 30 minutes at the same temperature, for 1 hour in an ice-water mixture and for 3 hours at room temperature. Removal of a solvent from the reaction mixture afforded an oily residue which was dissolved into 15 ml. of 10% sodium bicarbonate aqueous solution. The resulting aqueous layer was adjusted to pH 1.0–2.0 with 10% hydrochloric acid, washed with ether and extracted with ethyl acetate. The extract was washed with water, dried over sodium sulfate and concentrated under reduced pressure leaving a residue which was triturated with ethyl acetate to obtain 54 mg. of powder, 7 - (5-mehtyl-1H-tetrazol-1-yl)acetamidocephalosporanic acid, M.P. 119°–121° C. (decomp.).

Preparation 2—7-bromoacetamidocephalosporanic acid

To a stirred solution of 20.0 g. of 7-aminocephalosporanic acid and 14.0 g. of sodium bicarbonate in 120 ml. of water and 70 ml. of acetone cooled in an ice-water mixture was added a mixture of 14.0 g. of bromoacetyl chloride in 50 ml. of acetone during a period of 15 mintues. The resulting mixture was stirred for 2 hours at 0°–5° C. and for additional 2 hours at room temperature. The reaction mixture was washed with ethyl acetate, adjusted to pH 4.0 with 10% hydrochloric acid and extracted with ether. The resulting ether layer was allowed to stand to form a crystalline material which was washed with ether to obtain 4.2 g. of 7-bromoacetamidocephalosporanic acid.

The other fractionated aqueous layer was adjusted to pH 3.0 with 10% hydrochloric acid and extracted with ethyl acetate. The resulting organic layer was washed with water, dried over sodium sulfate and concentrated under reduced pressure leaving a crystalline material which was washed with ether to obtain 1.8 g. of the object compound, M.P. 165° C. (decomp.).

Preparation 3—Sodium 7 - (1 - methyl - 1H - tetrazol-5 - ylthio) - acetamidocephalosporanate from 7 - bromoacetamidocephalosporanic acid To a mixture of 1.57 g. of 7-bromoacetamidocephalosporanic acid in 6 ml. of water was added a solution of 332 mg. of sodium bicarbonate in 18 ml. of 95% ethanol. To this mixture was then added 660 mg. of sodium 1 - methyl - 1H - tetrazole - 5 - thiolate. After stirring for 2.5 hours at room temperature, the reaction mixture was concentrated under reduced pressure leaving a residue which was dissolved into 20 ml. of water, adjusted to pH 4.0 with 10% hydrochloric acid and treated with ether. The resulting solution was adpjusted to pH 2.0 with 10% hydrochloric acid and extracted with ethyl acetate to produce an organic layer which was then washed with water, dried over sodium sulfate and concentrated under reduced pressure. The resulting residue was triturated with ether to obtain 810 mg. of the crude product.

The crude product (800 mg.) was dissolved in 10 ml. of acetone and treated with 310 mg. of sodium α-hexanoate. The resulting solution was concentrated under reduce pressure leaving a residue which was washed in turn with ether and acetone to obtain 415 mg. of sodium 7 - ( 1 - methyl - 1H - tetrazol - 5 - ylthio)cephalosporanate, M.P. 172°–174° C. (decomp.).

Preparation 4—7 - (D - 5 - aminoadipinamido) - 3 - (1 - methyl - 1H - tetrazol - 5 - ylthio)methylceph - 3 - em-4-carboxylic acid A solution of 14.2 g. of sodium 7-(D-5-aminoadipinamido)cephalosporanate and 5.22 g. of 1 - methyl-1H-tetrazole-5-thiol in 100 ml. of water was adjusted to pH 5.5 with 5% sodium bicarbonate aqueous solution and stirred for 6.5 hours at 60° C. After adding 1000 ml. of acetone, the reaction mixture was allowed to stand overnight to form an oily precipitate which was triturated with 500 ml. of acetone, collected by filtration and washed with 300 ml. of acetone to obtain 14.1 g. of powders, sodium 7 - (D - 5 - aminoadipinamido)-3-(1-methyl - 1H - tetrazol - 5 - ylthio)methylcepth-3-em-4-carboxylate, M.P. 155°–170° C.

Preparation 5—7-amino-3-(1-methyl-1H-tetrazol-5-ylthio)-methylceph-3-em-4-carboxylic acid 3.0 g. of sodium 7 - (D - 5 - aminoadipinamido)-3 - (1 - methyl - 1H - tetrazol - 5 - ylthiomethyl)-3-cephem-4-carboxylate was dissolved in 20 ml. of formic acid cooled in an ice-water mixture. After adding 20 ml. of acetonitrile, the solution was cooled to −12° C. and thereafter treated with a solution of 0.78 g. of nitrosyl chloride in 6 ml. of acetonitrile which was added under vigorous stirring during a period of 7 minutes. The resulting solution was stirred for 8 hours at −8° C. and poured into 400 ml. of methanol. The solution was stirred for 10 minutes and adjusted to pH 4.0 with 0.8 ml. of a concentrated ammonium solution to form a crystalline material which was collected by filtration and washed with methanol and then with ether to obtain 459 mg. of 7-amino - 3 - (1 - methyl - 1H - tetrazol - 5 - ylthio) methylcepth-3-em-4-carboxylic acid, M.P. 175° C. (decomp.).

Preparation 6—7 - bromoacetamido - 3 - (1 - methyl-1H - tetrazol - 5 - ylthio)methylceph - 3 - em - 4 - carboxylic acid 3.5 g. of 7 - amino - 3 - (1 - methyl - 1H - tetrazol-5 - ylthio) - methylcepth 3 - em - 4 - carboxylic acid and 3.0 g. of sodium bicarbonate were dissolved into 40 ml. of water and 20 ml. of acetone. After adding a mixture of 2.02 g. of bromoacetyl chloride in 10 ml. of acetone in an ice-water mixture, the solution was stirred for 40 minutes under same conditions and then for 2 hours at room temperature. The resulting solution was adjusted to pH 4.0 with diluted hydrochloric acid and treated with ether to obtain an aqueous layer which was then extracted with ethyl acetate. The extract was dried over sodium sulfate and concentrated under reduced pressure leaving a residue which was treated with ether to obtain 2.36 g. of 7 - bromoacetamido - 3 - (1 - methyl-1H - tetrazol - 5 - ylthio) - methylceph - 3 - em- 4 - carboxylic acid.

UV: $\lambda_{max.}^{phosphate\ buffer\ (pH\ 6.4)}$ 268 m$\mu$ ($E_{1cm}^{1\%}$ 214)

Preparation 7—7-amino-3-(1-methyl-1H-tetrazol-5-ylthio)-methylceph-3-em-4-carboxylic acid To a mixture of 1.0 g. of 7-aminocephalosporanic acid and 515 mg. of 1-methyl-1H-tetrazole-5-thiol in 20 ml. of water and 20 ml. of acetone, sodium bicarbonate was added until the reactants were dissolved completely. The resulting solution was stirred for 6 hours at 60° C. and concentrated under reduced pressure leaving a residue which was dissolved in 30 ml. of water and acidified with dilute hydrochloric acid. The resulting solution was adjusted to pH 4.0 with 10% hydrochloric acid to form a precipitate which was collected by filtration and washed with 99% ethanol to obtain 240 mg. of 7-amino-3-(1-methyl-1H-tetrazol - 5 - ylthio)methylceph - 3 - em - 4-carboxylic acid, M.P. 175° C. (decomp.).

EXAMPLE 1

A solution of 1.0 g. of sodium 7-(2-thienyl)acetamidocephalosporanate and 450 mg. of 1-cyclohexyl-1H-tetrazole-5-thiol in 20 ml. of phosphate buffer (pH 6.4) was stirred for 5 hours at 60° C. The resulting oils were obtained by decantation and treated with ethanol to obtain 255 mg. of powder, 7-(2-thienyl)acetamido-3-(1- cyclohexyl - 1H-tetrazol - 5 - ylthio)methylceph - 3-carboxylic acid, M.P. 152°–156° C. (decomp.).

UV: $\lambda_{max.}^{phosphate\ buffer\ (pH\ 6.4)}$ 236, 270 m$\mu$ ($E_{1\ cm.}^{1\%}$ 340, 163)

EXAMPLE 2

In the same manner as shown in Example 1, starting from 7-acylated aminocephalosporanic acid and the appropriate thiol, there was obtained:

7-(2-thienyl)acetamido - 3 - (1-n-butyl - 1H - tetrazol-5-ylthio)methylceph - 3 - em - 4 - carboxylic acid, M.P. 140°–145° C. (decomp.).

UV: $\lambda_{max.}^{phosphate\ buffer\ (pH\ 6.4)}$ 237, 270 m$\mu$ ($E_{1\ cm.}^{1\%}$ 288, 158)

EXAMPLE 3

A solution of 840 mg. of sodium 7-(5-methyl-1H-tetrazol-1-yl)acetamidocephalosporanate, 480 mg. of 5-nitrobenzoxazole-2-thiol and 200 mg. of sodium bicarbonate in 20 ml. of water was stirred for 4.5 hours at 60° C. The reaction mixture was concentrated under reduced pressure leaving an oily residue which was triturated with 200 ml. of acetone to obtain 900 mg. of sodium 7-(5-methyl-1H-tetrazol - 1 - yl)acetamido - 3-(5-nitrobenzoxazol - 2 - ylthio)methylceph - 3 - em - 4-carboxylate, M.P. 196°–202° C. (decomp.).

UV: $\lambda_{max.}^{H_2O}$ 266 m$\mu$ ($E_{1\ cm.}^{1\%}$ 329)

MIC(mcg./ml.) E. coli 20.0, S. aur. 0.25.

EXAMPLE 4

A solution of 1.0 g. of sodium 7-(2-thienyl)acetamidocephalosporanate, 1.1 g. of 1-p-chlorophenyl-1H-tetrazole-5-thiol and 420 mg. of sodium bicarbonate in 20 ml. of Britton-Robinson buffer (pH 4.51) was stirred for 6 hours at 60° C. The reaction mixture was adjusted to pH 2.0 with 10% hydrochloric acid to form a precipitate which was collected by filtration and washed with water and then with ether to obtain 7 - (2 - thienyl)acetamido-3 - (1-p - chlorophenyl - 1H - tetrazol - 5-ylthio)methylceph-3-em-4-carboxylate.

The above compound was dissolved into acetone and treated with dicyclohexylamine to obtain the dicyclohexylamine salt of 7-(2-thienyl)acetamido-3-(1-p-chlorophenyl-1H-tetrazol-5-ylthio)methylceph - 3 - em - 4-carboxylic acid, M.P. 176°–178° C. (decomp.).

UV: $\lambda_{max.}^{95\%\ C_2H_5OH}$ 233 m$\mu$ ($E_{1\ cm.}^{1\%}$ 346.5)

MIC(mcg./ml.) E. coli 2.0, S. aur 0.25.

EXAMPLE 5

A solution of 140 mg. of 2-methyl-1,3,4-oxidiazole-5-thiol, 102 mg. of sodium bicarbonate and 400 mg. of sodium 7 - (1H-tetrazol-1-yl)acetamidocephalosporanate in 10 ml. of water was stirred for 11 hours at 60° C. After adjusting the pH value of the resulting mixture to 3.0 with 5% hydrochloric acid, treatment of the solution with ether resulted in formation of a precipitate in the aqueous layer which was washed with ethyl acetate and collected by filtration. The resulting crude product (252 mg.) was recrystallized from aqueous acetone to obtain 105 mg. of needles, 7-(1H-tetrazol-1-yl)acetamido-3-(2-methyl-1,3,4-oxadiazol-5-ylthio)methylceph - 3 - em - 4-carboxylic acid, M.P. 205°–207° C. (decomp.).

Analysis.—Calculated for $C_{14}H_{14}N_8O_5S_2$ (percent): C, 38.35; H, 3.22; N, 25.56. Found (percent): C, 38.41; H, 3.55; N, 25.42.

UV: $\lambda_{max.}^{phosphate\ buffer\ (pH\ 6.4)}$ 268 m$\mu$ ($E_{1\ cm.}^{1\%}$ 253)

MIC(mcg./ml.) E. coli 10.0, S. aur. 1.0.

EXAMPLE 6

988 mg. of 7 - (4-methyl-1,3-oxazol-5-yl)acetamidocephalosporanic acid and 618 mg. of 1-phenyl-1H-tetrazole-5-thiol were dissolved into a solution of 562 mg. of sodium bicarbonate in 20 ml. of water. The solution was stirred for 5 hours at 60° C. After adding 150 ml. of acetone, the solution was allowed to stand overnight and then the resulting precipitate was removed. The resulting acetone layer was concentrated under reduced pressure leaving an oily residue which was treated with acetone to obtain 373 mg. of sodium 7-(4-methyl-1,3-oxazol-5-yl)acetamido-3-(1-phenyl - 1H - tetrazol - 5-ylthio)methylceph - 3 - em-4-carboxylate, M.P. 240° C. (decomp.).

UV: $\lambda_{max.}^{H_2O}$ 265 m$\mu$ ($E_{1\ cm.}^{1\%}$ 157.5)

MIC(mcg./ml.) E. coli 10.0, S. aur. 0.5.

EXAMPLE 7

1.0 g. of sodium 7 - (1H-benzotriazol-1-yl)acetamidocephalosporanate, 0.8 g. of 1--phenyl-1H-tetrazole-5-thiol and 0.4 g. of sodium bicarbonate were added to a mixed solution of 9 ml. of acetone and 45 ml. of water. The mixture was stirred for 30 minutes at room temperature, for 2.5 hours at 60° C. and again for 30 minutes at room temperature. After removing acetone, the resultant condensate was cooled immediately to obtain a precipitate. It was collected by filtration and dried to afford 380 mg. of a white crystal, sodium 7 - (1H - benzotriazol-1-yl)acetamido-3-(1-phenyl-1H-tetrazol-5-ylthio) - methylceph - 3-em-4-carboxylate, M.P. 120°–125° C. (decomp.).

UV: $\lambda_{max.}^{H_2O}$ 260 m$\mu$ ($E_{1\ cm.}^{1\%}$ 263)

MIC(mcg./ml.) E. coli 10.0, S. aur. 1.0.

EXAMPLE 8

To a mixture of 1.5 g. of 7-(5-chloro-2-thienylthio)-acetamidocephalosporanic acid in a mixed solution of 10 ml. of acetone and 5 ml. of water was added a solution of 272 mg. of sodium bicarbonate in 5 ml. of water. To the mixed solution was added a solution of 800 mg. of 1-phenyl-1H-tetrazole-5-thiol and 380 mg. of sodium bicarbonate in 20 ml. of water. The resulting solution was kept to maintain the reaction temperature at 40° C. for 2 days. After saturated sodium chloride solution was added to the reaction mixture, the resulting oils were collected by decantation, dissolved in chloroform and treated with petroleum ether to form a crystalline material which was dissolved into chloroform and treated with petroleum ether to form a crystalline material which was dissolved into tetrahydrofuran. The solution was concentrated under reduced pressure leaving a residue which was treated with ether to obtain 1.04 g. of powders, sodium 7-(5-chloro-2-thienylthio)acetamido-3 - (1-phenyl-1H-tetrazol-5-ylthio)methylceph-3-em-4-carboxylate, M.P. 40°–45° C.

UV: $\lambda_{max.}^{H_2O}$ 262 m$\mu$ ($E_{1\ cm.}^{1\%}$ 197)

EXAMPLE 9

A solution of 500 mg. of sodium 7-(1H-tetrazol-1-yl) acetamidocephalosporanate and 212 mg. of 2-ethyl-1,3,4-thiadiazole-5-thiol in 20 ml. of phosphate buffer (pH 6.4) was stirred for 5.5 hours at 60° C. The reaction mixture was adjusted to pH 2.0 with 5% hydrochloric acid and treated with ethyl acetate to form a crystalline material (200 mg.), 7-(1H-tetrazol-1-yl)acetamido-3-(2-ethyl-1,3, 4 - thiadiazol-5-ylthio)methylceph-3-em-4-carboxylic acid, M.P. 200° C. (decomp.).

UV: $\lambda_{max.}^{phosphate\ buffer\ (pH\ 6.4)}$ 273 m$\mu$ ($E_{1\ cm.}^{1\%}$ 293)

EXAMPLE 10

A solution of 1.0 g. of sodium 7-(2-thienyl)acetamidocephalosporanate, 550 mg. of 2-phenyl-1,3,4-oxadiazole-5-thiol and 260 mg. of sodium bicarbonate in 20 ml. of water was treated for 4 hours at 55° C. The formed crystalline material was collected by filtration and washed with ether to obtain 710 mg. of sodium 7-(2-thienyl)acetamido-3-(2-phenyl - 1,3,4 - oxadiazol-5-ylthio)methylceph-3-em-4-carboxylate, M.P. 230°–231° C. (decomp.).

UV: $\lambda_{max.}^{2\% \text{ dimethylformamide}}$ 276 m$\mu$ ($E_{1\,cm.}^{1\%}$ 429)

EXAMPLE 11

In the same manner as shown in Example 10, starting from 7-acylated aminocephalosporanic acids and the appropriate thiols there were obtained:

(a) Sodium 7-(5-chloro-2-thienyl)acetamido-3-(5-nitro-2-benzoxazolylthio)methylceph-3-em-4-carboxylate, M.P. 167°–170° C.

UV: $\lambda_{max.}^{H_2O}$ 260 m$\mu$ ($E_{1\,cm.}^{1\%}$ 453.7)

(b) Sodium 7-(5-chloro-2-thienyl)acetamido - 3 - (5-chloro-2-benzoxazolylthio)methylceph-3-em - 4 - carboxylate, M.P. 120° C. (decomp.).

UV: $\lambda_{max.}^{H_2O}$ 299 m$\mu$ ($E_{1\,cm.}^{1\%}$ 225)

EXAMPLE 12

A solution of 1.0 g. of sodium 7-(2-thienyl)acetamidocephalosporanate, 420 mg. of sodium bicarbonate and 1.03 g. of 1-phenyl-1H-tetrazole-5-thiol in 40 ml. of a 1:1 acetone:water solution was stirred for 6 hours at 60° C. in nitrogen gas atmosphere. There was then removed acetone under reduced pressure from the reaction mixture leaving an aqueous condensate which was adjusted to pH 2.0 with 10% hydrochloric acid and extracted with ethyl acetate. After the ethyl acetate layer was washed with a saturated sodium chloride solution and dried over sodium sulfate, the resulting solution was concentrated leaving a residue which was treated with ether. The resulting precipitate was then dissolved into acetone and treated with sodium 2-ethylhexanoate to form a residue which was then treated with 75% ethanol to obtain 450 mg. of a crystal, sodium 7-(2-thienyl)acetamido-3-(1-phenyl-1H-tetrazol-5-ylthio)methylceph-3-em - 4 - carboxylate, M.P. 155°–157° C. (decomp).

UV: $\lambda_{max.}^{\text{phosphate buffer (pH 6.4)}}$ 234–235 m$\mu$ ($E_{1\,cm.}^{1\%}$ 345)

EXAMPLE 13

A solution of 860 mg. of 7-(1,3,4-thiadiazol-2-ylthio)-acetamidocephalosporanic acid, 288 mg. of 2-ethyl-1,3,4-thiadiazole-5-thiol and 400 mg. of sodium bicarbonate in phosphate buffer (pH 7.0) was stirred for 5 hours at 60° C. The reaction mixture was adjusted to pH 7.0 with sodium bicarbonate and washed with ether. After the resulting aqueous layer was washed with ethyl acetate, it was adjusted to pH 4.0 with diluted hydrochloric acid and extracted with ethyl acetate. The resulting ethyl acetate layer was washed with water, dried over sodium sulfate and concentrated in vacuo leaving a residue which was triturated with ether to obtain the crude powder (167 mg.), 7 - (1,3,4-thiadiazol-2-ylthio)acetamido-3-(2-ethyl-1,3,4 - thiadiazol-5-ylthio)methylceph-3-em-4 - carboxylic acid, M.P. 95°–102° C.

UV: $\lambda_{max.j}^{\text{phosphate buffer (pH 6.4)}}$ 268 m$\mu$ ($E_{1\,cm.}^{1\%}$ 306)

EXAMPLE 14

In the same manner as shown in Example 13, starting from 7-acylated aminocephalosporanic acids and the appropriate thiols, there were obtained:

(a) 7 - (1,3,4 - thiadiazol - 2 - ylthio) acetamido - 3 - (2-n-propyl-1,3,4-thiadiazol-2-ylthio) methylceph-3-em-4-carboxylic acid, M.P. 185°–186° C. (decomp.).

UV: $\lambda_{max.}^{\text{phosphate buffer (pH 6.4)}}$ 269 m$\mu$ ($E_{1\,cm.}^{1\%}$ 322)

(b) Dicyclohexylamine salt of 7(1,3,4-thiadiazol-2-ylthio) acetamido-3-(1-ethyl-1H-tetrazol-5-ylthio) methylceph-3-em-4-carboxylic acid, M.P., 169°–173° C. (decomp.).

UV: $\lambda_{max.}^{95\% \ C_2H_5OH}$ 265 m$\mu$ ($E_{1\,cm.}^{1\%}$ 211)

(c) 7-(1H-benzotriazol-1-yl) acetamido-3-(1-methyl-1H-tetrazol-5-ylthio) methylceph-3-em-4-carboxylic acid, M.P. 105°–110° C. (decomp.).

UV: $\lambda_{max.}^{\text{phosphate buffer (pH 6.4)}}$ 261 m$\mu$ ($E_{1\,cm.}^{1\%}$ 330)

EXAMPLE 15

A solution of 856 mg. of 7-(2-methyl-1,3,4-oxadiazol-5-ylthio) acetamidocephalosporanic acid, 332 mg. of 2-ethyl-1,3,4-thiadiazole-5-thiol and 168 mg. of sodium bicarbonate in 50 ml. of phosphate buffer (pH 6.5) was stirred for 6 hours at 60° C. After washing the reaction mixture with ether, the resulting aqueous layer was acidified with 10% hydrochloric acid and extracted with two 50 ml. portions of ethyl acetate. The organic layer was washed with water dried over sodium sulfate and concentrated under reduced pressure leaving a residue which was triturated with ether to obtain the crude powder (404.5 mg.), 7-(2-methyl-1,3,4-oxadiazol-5-ylthio) acetamido-3-(2-ethyl-1,3,4-thiadiazol-5-ylthio) methylceph-3-em-4-carboxylic acid, M.P. 110°–115° C. (decomp.).

UV: $\lambda_{max.}^{95\% \ C_2H_5OH}$ 270 m$\mu$ ($E_{1\,cm.}^{1\%}$ 239)

EXAMPLE 16

In the same manner as shown in Example 15, starting from 7-acylated aminocephalosporanic acids and the appropriate thiols, there were obtained:

(a) 7-(2-methyl-1,3,4-oxadiazol-5-ylthio) acetamido-3-(2-n-propyl-1,3,4-thiadiazol-5-ylthio) methylceph-3-em-4-carboxylic acid, M.P. 98°–103° C. (decomp.).

UV: $\lambda_{max.}^{95\% \ C_2H_5OH}$ 270.5 m$\mu$ ($E_{1\,cm.}^{1\%}$ 243.1)

(b) 7-(2-methyl-1,3,4-oxadiazol-5-ylthio) acetamido-3-(1-ethyl-1H-tetrazol-5-ylthio) methylceph-3-em-4-carboxylic acid, M.P. 99°–105° C. (decomp.).

UV: $\lambda_{max.}^{\text{phosphate buffer (pH 6.4)}}$ 270 m$\mu$ ($E_{1\,cm.}^{1\%}$ 199)

(c) 7-(1H-tetrazol-1-yl) acetamido-3-(1,3,4-thiadiazol-2-ylthio) methylceph-3-em-4-carboxylic acid, M.P. 155° C. (decomp.).

UV: $\lambda_{max.}^{\text{phosphate buffer (pH 6.4)}}$ 273 m$\mu$ ($E_{1\,cm.}^{1\%}$ 274)

(d) 7-(1H-tetrazol-1-yl) acetamido-3-(1-ethyl-1H-tetrazol-5-ylthio) methylceph-3-em-4-carboxylic acid, M.P. 145° C. (decomp.).

UV: $\lambda_{max.}^{\text{phosphate buffer (pH 6.4)}}$ 269.5 m$\mu$ ($E_{1\,cm.}^{1\%}$ 204)

(e) 7-(4-pyridylthio) acetamido-3-(2-ethyl-1,3,4-thiadiazol-5-ylthio) methylceph-3-em-4-carboxylic acid, M.P. 151° C. (decomp.).

UV: $\lambda_{max.}^{\text{phosphate buffer (pH 6.4)}}$ 262.5 m$\mu$ ($E_{1\,cm.}^{1\%}$ 314)

(f) 7-(2-thienyl) acetamido-3-(1-ethyl-1H-tetrazol-5-yl-thio) methylceph-3-em-4-carboxylic acid, M.P. 95°–100° C. (decomp.).

UV: $\lambda_{max.}^{\text{phosphate buffer (pH 6.4)}}$ 235, 268 m$\mu$ ($E_{1\,cm.}^{1\%}$ 315, 186)

(g) Sodium 7-(2-thienyl) acetamido-3-(2-isopropyl-1,3,4-thiadiazol-5-ylthio) methylceph-3-em-4-carboxylate, M.P. 195°–197° C. (decomp.).

UV: $\lambda_{max.}^{\text{phosphate buffer (pH 6.4)}}$ 237, 272 m$\mu$ ($E_{1\,cm.}^{1\%}$ 301, 254)

(h) Sodium 7-(2-thienyl) acetamido-3-(2-n-propyl-1,3,4-thiadiazol-5-ylthio) methylceph-3-em-4-carboxylate, M.P. 192°–194° C. (decomp.).

UV: $\lambda_{max.}^{\text{phosphate buffer (pH 6.4)}}$ 237, 272 m$\mu$ ($E_{1\,cm.}^{1\%}$ 295, 242)

(i) Dicyclohexylamine salt of 7-(2-thienyl) acetamido-3-(1-methyl-1H-tetrazol-5-ylthio) methylceph-3-em-4-carboxylic acid, M.P. 192°–194° (decomp.).

UV: $\lambda_{max.}^{95\% \ C_2H_5OH}$ 236 m$\mu$ ($E_{1\,cm.}^{1\%}$ 271)

$\lambda_{max.}^{95\% \ C_2H_5OH}$ 270 m$\mu$ ($E_{1\,cm.}^{1\%}$ 122)

(j) 7-(2-thienyl) acetamido-3-(2-methyl-1,3,4-oxidazol-5-ylthio) methylceph-3-em-4-carboxylic acid, M.P. 92°–94– C. (decomp.).

UV: $\lambda_{max.}^{95\%\ C_2H_5OH}$ 235, 266 m$\mu$ ($E_{1\ cm.}^{1\%}$ 372, 231)

(k) Dicyclohexylamine salt of 7-(5-chloro-2-thienyl)-acetamido - 3 - (1 - methyl - 1H - tetrazol - 5 - ylthio) methylceph-3-em - 4 - carboxylic acid, M.P. 183° C. (decomp.).

UV: $\lambda_{max.}^{95\%\ C_2H_5OH}$ 245 m$\mu$ ($E_{1\ cm.}^{1\%}$ 254)

(l) Sodium 7 - (1H - tetrazol - 1 - yl)acetamido - 3 - (1 - methyl - 1H - tetrazol - 5 - ylthio)methylceph - 3 - em-4-carboxylate, M.P. 188°–191° C. (decomp.).

UV: $\lambda_{max.}^{H_2O}$ 269 m$\mu$ ($E_{1\ cm.}^{1\%}$ 220)

(m) 7 - (5 - methyl - 1H - tetrazol - 1 - yl)acetamido-3 - (2 - methyl - 1,3,4 - oxadiazol - 5 - ylthio)methylceph-3-em-4-carboxylic acid, M.P. 98°–103° C. (decomp.).

UV: $\lambda_{max.}^{95\%\ C_2H_5OH}$ 268 m$\mu$ ($E_{1\ cm.}^{1\%}$ 213)

(n) 7 - (4 - methyl - 1,3 - thiazol - 2 - yl)acetamido - 3-(1 - methyl - 1H - tetrazol - 5 - ylthio)methylceph - 3-em-4-carboxylic acid, M.P. 120° C. (decomp.).

UV: $\lambda_{max.}^{phosphate\ buffer\ (pH\ 6.4)}$ 254.5 m$\mu$ ($E_{1\ cm.}^{1\%}$ 203)

(o) 7 - (1 - methyl - 1H - tetrazol - 5 - yl)acetamido - 3-(1 - ethyl - 1H - tetrazol - 5 - ylthio)methylceph 3 - em-4-carboxylic acid, M.P. 155° C. (decomp.).

UV: $\lambda_{max.}^{phosphate\ buffer\ (pH\ 6.4)}$ 268 m$\mu$ ($E_{1\ cm.}^{1\%}$ 252)

(p) 7 - (1 - methyl - 1H - tetrazol - 5 - yl)acetamido-3 - (1,3,4 - thiodiazol - 5 - ylthio)methylceph - 3 - em - 4-carboxylic acid, M.P. 160°–165° C. (decomp.).

UV: $\lambda_{max.}^{phosphate\ buffer\ (pH\ 6.4)}$ 272 m$\mu$ ($E_{1\ cm.}^{1\%}$ 245)

(q) 7 - (1H - tetrazol - 5 - yl)acetamido - 3 - (2 - ethyl-1,3,4 - thiadiazol - 5 - ylthio)methyl - ceph - 3 - em - 4-carboxylic acid, M.P. 151–157° C. (decomp.).

UV: $\lambda_{max.}^{phosphate\ buffer\ (pH\ 6.4)}$ 273 m$\mu$ ($E_{1\ cm.}^{1\%}$ 241.5)

(r) 7 - (1 - methyl - 1H - tetrazol - 5 - yl)acetamido-3 - (1 - methyl - 1H - tetrazol - 5 - ylthio)methylceph - 3-em-4-carboxylic acid, M.P. 107°–112° C. (decomp.).

UV: $\lambda_{max.}^{phosphate\ buffer\ (pH\ 6.4)}$ 268 m$\mu$ ($E_{1\ cm.}^{1\%}$ 201)

EXAMPLE 17

A solution of 1.0 g. of sodium 7-(2-thienyl)acetamidocephalosporanate and 0.4 g. of 3,4-dimethyl-4H-1,2,4-triazole-5-thiol in 20 ml. of phosphate buffer (pH 6.4) was stirred for 5 hours at 60° C. The reaction mixture was adjusted to pH 2.0 with 10% hydrochloric acid and extracted with 200 ml. of ethyl acetate. The resulting ethyl acetate layer was dried over sodium sulfate and concentrated under reduced pressure leaving a precipitate which was treated with 77 mg. of dicyclohexylamine in aqueous acetone to obtain the dicyclohexylamine salt of 7 - (2 - thienyl)acetamido - 3 - (3,4 - dimethyl - 4H - 1,2,4 - triazol - 5 - ylthio)methylceph - 3 - em - 4 - carboxylic acid, M.P. 178°–182° C. (decomp.).

UV: $\lambda_{max.}^{95\%\ C_2H_5OH}$ 239 m$\mu$ ($E_{1\ cm.}^{1\%}$ 214)

EXAMPLE 18

In the same manner as shown in Example 17, starting from 7-acylated aminocephalosporanic acids and the appropriate thiols, there were produced:

(a) 7 - (5 - methyl - 1H - tetrazol - 1 - yl)acetamido-3 - (1 - phenyl - 1H - tetrazol - 5 - ylthio)methylceph - 3-em-4-carboxylic acid, M.P. 110°–116° C. (decomp.).

UV: $\lambda_{max.}^{95\%\ C_2H_5OH}$ 263 m$\mu$ ($E_{1\ cm.}^{1\%}$ 206)

(b) 7 - (1H - tetrazol - 1 - yl)acetamido - 3 - (2 - methyl - 1,3,4 - thiadiazol - 5 - ylthio)methylceph - 3 - em - 4-carboxylic acid, M.P. 198°–200° C. (decomp.).

UV: $\lambda_{max.}^{phosphate\ buffer\ (pH\ 6.4)}$ 272 m$\mu$ ($E_{1\ cm.}^{1\%}$ 283)

(c) Dicyclohexylamine salt of 7-(2-thienyl)acetamido-3 - (1,3,4 - thiadiazol - 5 - ylthio)methylceph - 3 - em - 4-carboxylic acid, M.P. 186° C. (decomp.).

UV: $\lambda_{max.}^{95\%\ C_2H_5OH}$ 236, 276 m$\mu$ ($E_{1\ cm.}^{1\%}$ 263, 185)

(d) 7 - (2 - thienyl)acetamido - 3 - (2 - methyl - 1,3,4-thiadiazol - 5 - ylthio)methylceph - 3 - em - 4 - carboxylic acid, M.P. 176° C. (decomp.).

UV: $\lambda_{max.}^{95\%\ C_2H_5OH}$ 239, 273 m$\mu$ ($E_{1\ cm.}^{1\%}$ 322, 275)

(e) Dicyclohexylamine salt of 7-(2-thienyl)acetamido-3 - (1 - isopropyl - 1H - tetrazol - 5 - ylthio)methylceph-3-em-4-carboxylic acid, M.P. 175°–176° C.

UV: $\lambda_{max.}^{95\%\ C_2H_5OH}$ 232–233 m$\mu$ ($E_{1\ cm.}^{1\%}$ 298)

$\lambda_{max.}^{95\%\ C_2H_5OH}$ 271 m$\mu$ ($E_{1\ cm.}^{1\%}$ 146)

(f) Dicyclohexylamine salt of 7-(2-thienyl)acetamido-3-(2-ethyl-1,3,4-thiadiazol - 5 - ylthio)methylceph-3-em-4-carboxylic acid, M.P. 158°–161° C. (decomp.).

UV: $\lambda_{max.}^{95\%\ C_2H_5OH}$ 236, 277 m$\mu$ ($E_{1\ cm.}^{1\%}$ 238, 163)

(g) 7-(2-methyl - 1,3,4 - oxadiazol-5-ylthio)acetamido-3-(2-methyl - 1,3,4 - thiadiazol-5-ylthio)methylceph-3-em-4-carboxylic acid, M.P. 113°–114° C. (decomp.).

UV: $\lambda_{max.}^{phosphate\ buffer\ (pH\ 6.4)}$ 271 m$\mu$ ($E_{1\ cm.}^{1\%}$ 232)

(h) 7-(2-methyl - 1,3,4 - oxadiazol-5-ylthio)acetamido-3-(1-methyl - 1H - tetrazol-5-ylthio)methylceph-3-em-4-carboxylic acid, M.P. 193–194° C. (decomp.).

UV: $\lambda_{max.}^{phosphate\ buffer\ (pH\ 6.4)}$ 268 m$\mu$ ($E_{1\ cm.}^{1\%}$ 220)

(i) 7-(1-methyl - 1H - tetrazol-5-ylthio)acetamido-3-(2-methyl - 1,3,4 - thiadiazol-5-ylthio)methylceph-3-em-4-carboxylic acid, M.P. 120°–123° C. (decomp.).

UV: $\lambda_{max.}^{phosphate\ buffer\ (pH\ 6.4)}$ 277 m$\mu$ ($E_{1\ cm.}^{1\%}$ 213.3)

(j) 7-(1-methyl - 1H - tetrazol-5-ylthio)acetamido-3-(1,3,4 - thiadiazol - 5 - ylthio)methylceph-3-em-4-carboxylic acid, M.P. 112°–114° C. (decomp.).

UV: $\lambda_{max.}^{phosphate\ buffer\ (pH\ 6.4)}$ 272 m$\mu$ ($E_{1\ cm.}^{1\%}$ 250.4)

(k) Dicyclohexylamine salt of 7-(2-methyl-1,3,4-thiadiazol-5-ylthio)acetamido - 3 - (1,3,4-thiadiazol-5-ylthio) methylceph-3-em-4-carboxylic acid, M.P. 178°–179° C.

UV: $\lambda_{max.}^{95\%\ C_2H_5OH}$ 272 m$\mu$ ($E_{1\ cm.}^{1\%}$ 249)

(l) 7 - (1,3,4-thiadiazol-5-ylthio)acetamido - 3 - (2-methyl - 1,3,4 - thiadiazol-5-ylthio)methylceph-3-em-4-carboxylic acid, M.P. 79°–83° C. (decomp.).

UV: $\lambda_{max.}^{phosphate\ buffer\ (pH\ 6.4)}$ 268 m$\mu$ ($E_{1\ cm.}^{1\%}$ 278.7)

(m) 7 - (2-methyl-1,3,4-oxadiazol-5-ylthio)acetamido-3-(1,3,4-thiadiazol - 2 - ylthio)methylceph-3-em-4-carboxylic acid, M.P. 100°–102° C. (decomp.).

UV: $\lambda_{max.}^{phosphate\ buffer\ (pH\ 6.4)}$ 268 m$\mu$ ($E_{1\ cm.}^{1\%}$ 246)

(n) 7-(1-methyl - 1H - tetrazol-5-yl)acetamido-3-(2-methyl - 1,3,4 - thiadiazol-5-ylthio)methylceph-3-em-4-carboxylic acid, M.P. 149°–154° C. (decomp.).

UV: $\lambda_{max.}^{phosphate\ buffer\ (pH\ 6.4)}$ 273 m$\mu$ ($E_{1\ cm.}^{1\%}$ 239)

(o) 7-(2-thienyl)carbonamido - 3 - (2-methyl-1,3,4-thiadiazol-5-ylthio)methylceph - 3 - em - 4 - carboxylic acid, M.P. 108°–114° C. (decomp.).

UV: $\lambda_{max.}^{phosphate\ buffer\ (pH\ 6.4)}$ 273 m$\mu$ ($E_{1\ cm.}^{1\%}$ 444.5)

EXAMPLE 19

A soultion of 3.0 g. of 7-bromoacetamidocephalosporanic acid, 1.05 g. of sodium 2-methyl-1,3,4-oxadiazole-5- thiolate and 640 mg. of sodium bicarbonate in 20 ml. of water was stirred for 30 minutes at room temperature. After additional 1.05 g. of sodium 2-methyl-1,3,4-oxadiazole-5-thiolate was added, the solution was stirred for 5 hours at 60° C. The reaction mixture was treated by the same method as shown in Example 15 to obtain 7-(2-methyl-1,3,4-oxadiazol-5-ylthio)acetamido-3-(2 - methyl-1,3,4-oxadiazol - 5 - ylthio)methylceph-3-em-4-carboxylic acid, M.P. 91°–94° C. (decomp.).

UV: $\lambda_{max.}^{phosphate\ buffer\ (pH\ 6.4)}$ 265 m$\mu$ ($E_{1\ cm.}^{1\%}$ 225)

EXAMPLE 20

In the same manner as shown in Example 19, starting from 7-haloacylated aminocephalosporanic acids and the appropriate thiols, there were obtained:

(a) Dicyclohexylamine salt of 7-(1-methyl-1H-tetrazol-5 - ylthio)acetamido-3-(1-methyl-1H-tetrazol-5-ylthio)-methylceph-3-em-4-carboxylic acid, M.P. 179°–181° C. (decomp.).

UV: $\lambda_{max.}^{95\%\ C_2H_5OH}$ 268 m$\mu$ ($E_{1\ cm.}^{1\%}$ 142)

(b) Sodium 7-(2-methyl - 1,3,4 - thiadiazol-5-ylthio) acetamido-3-(2-methyl - 1,3,4 - thiadiazol - 5 - ylthio) methylceph-3-em-4-carboxylate, M.P. 188°–192° C. (decomp.).

UV: $\lambda_{max.}^{H_2O}$ 268 m$\mu$ ($E_{1\ cm.}^{1\%}$ 297)

(c) 7-(1,3,4 - thiadiazol - 2 - ylthio)acetamido-3-(1,3,4 - thiadiazol - 2 - ylthio)methylceph-3-em-4-carboxylic acid, M.P. 84°–87° C. (decomp.).

UV: $\lambda_{max.}^{phosphate\ buffer\ (pH\ 6.4)}$ 266 m$\mu$ ($E_{1\ cm.}^{1\%}$ 293)

EXAMPLE 21

A solution of 1.0 g. of 7-bromoacetamido-3-(1-methyl-1H-tetrazole-5-ylthio)methylceph-3-em - 4 - carboxylic acid was adjusted to pH 6.0 with sodium bicarbonate. To this stirring solution was added a solution of 0.4 g. of sodium 2-methyl-1,3,4-thiadiazole-5-thiolate. The resulting solution was treated for 6 hours at room temperature. After the reaction was complete, the reaction mixture was adjusted to pH 4.0 with diluted hydrochloric acid and extracted with ether. The resulting aqueous layer was further adjusted to pH 3.0 with diluted hydrochloric acid and then extracted with ethyl acetate to form a precipitate which was treated with ether to obain 794 mg. of a solid, 7-(2-methyl-1,3,4-thiadiazol-5-ylthio) acetamido-3-(1-methyl-1H-tetrazol - 5 - ylthio)methylceph-3-em-4-carboxylic acid. The product was converted by the known method to its sodium salt, M.P. 153° C. (decomp.).

UV: $\lambda_{max.}^{phosphate\ buffer\ (pH\ 6.4)}$ 267 m$\mu$ ($E_{1\ cm.}^{1\%}$ 282)

EXAMPLE 22

In the same manner as shown in Example 21, starting from 3-thiolated 7-haloacylaminocephalosporanic acid and the appropriate thiol, there was obtained:
7-(1,3,4-thiadiazol-2-ylthio)acetamido - 3 - (1-methyl-1H-tetrazol-5-ylthio)methylceph-3-em-4-carboxylic acid, M.P. 82°–85° C. (decomp.).

UV: $\lambda_{max.}^{phosphate\ buffer\ (pH\ 6.4)}$ 265 m$\mu$ ($E_{1\ cm.}^{1\%}$ 281)

EXAMPLE 23

In the same manner as shown in Examples 1–3, starting from 3-thiolated 7-haloacylaminocephalosporanic acids and the appropriate thiols, there were obtained:

(a) 7-(4-pyridylthio)acetamido-3-(2 - methyl - 1,3,4-thiadiazol-5-ylthio)methylceph-3-em-4 - carboxylic acid, M.P. 125°–140° C. (decomp.).

UV: $\lambda_{max.}^{H_2O}$ 264 m$\mu$ ($E_{1\ cm.}^{1\%}$ 203)

(b) 7-(4-pyridylthio)acetamido-3-(1 - methyl - 1H-tetrazol-5-ylthio)methylceph-3-em - 4 - carboxylic acid, M.P. 108°–115° C. (decomp.).

UV: $\lambda_{max.}^{H_2O}$ 262 m$\mu$ ($E_{1\ cm.}^{1\%}$ 249)

EXAMPLE 24

To a cooled solution of 660 mg. of 7-amino-3-(1,3,4-thiadiazol-2-ylthio)methylceph-3-em - 4 - carboxylic acid and 600 mg. of sodium bicarbonate in 20% acetone aqueous solution cooled at 0°–5° C. in an ice-water mixture was poured dropwise a solution of 320 mg. of thiophene-2-acetyl chloride in 10 ml. of acetone. The solution was stirred for 1 hour at 0°–5° C. and for 2 hours at room temperature and allowed to stand overnight. The reaction mixture was treated by the same procedures as shown in Example 15 to obtain the crude product (700 mg.), 7-(2-thienyl)acetamido - 3 - (1,3,4-thiadiazol - 2-ylthio)methylceph-3-em-4- carboxylic acid, M.P. 82°–85° C. (decomp.).

UV: $\lambda_{max.}^{phosphate\ buffer\ (pH\ 6.4)}$ 265 m$\mu$ ($E_{1\ cm.}^{1\%}$ 281)

EXAMPLE 25

In the same manner as shown in Example 24, starting from 3-thiolated 7-aminocephalosporanic acids and the appropriate acids, there were obtained:

(a) Dicyclohexylamine salt of 7-(2-thienyl)acetamido-3-(1-methyl-1H-tetrazol-5-ylthio)methylceph - 3 - em - 4-carboxylic acid, M.P. 192°–193° C. (decomp.).

UV: $\lambda_{max.}^{95\%\ C_2H_5OH}$ 236,270 m$\mu$ ($E_{1\ cm.}^{1\%}$ 271,122)

(b) Dicyclohexylamine salt of 7-(5-chloro-2-thienyl)-acetamido-3-(2 - methyl-1,3,4-thiadiazol-5-ylthio)methylceph-3-em-4-carboxylic acid, M.P. 170°–173° C. (decomp.).

UV: $\lambda_{max.}^{95\%\ C_2H_5OH}$ 247,276 m$\mu$ ($E_{1\ cm.}^{1\%}$ 215,168)

(c) 7-(2-thienyl)acetamido - 3 - (2 - methyl - 1,3,4-thiadiazol-5-ylthio)methylceph-3-em-4 - carboxylic acid, M.P. 176° C. (decomp.).

UV: $\lambda_{max.}^{95\%\ C_2H_5OH}$ 239,273 m$\mu$ ($E_{1\ cm.}^{1\%}$ 322,275)

EXAMPLE 26

To a solution of 256 mg. of 1H-tetrazole-1-acetic acid and 202 mg. of triethylamine in 20 ml. of anhydrous tetrahydrofuran cooled to −10° C. was added a solution of 241 mg. of pivaloyl chloride in 2 ml. of anhydrous tetrahydrofuran. After the resulting solution was stirred for 30 minutes and cooled to −20° C., a solution of 656 mg. of 7-amino-3-(2-methyl-1,3,4-oxadiazol-5-ylthio)methylceph-3-em-4-carboxylic acid and 350 mg. of triethylamine in 30 ml. of anhydrous dichloromethane was added. The solution was stirred for 1 hour at −20° C., for 1 hour at 0°–5° C. and for 2 hours at room temperature, and allowed to stand overnight. After the resulting oils prepared by concentration of the reaction mixture was dissolved into 20 ml. of water and a small amount of 10% sodium bicarbonate aqueous solution, the solution was adjusted to pH 2.0 with 10% hydrochloric acid and extracted with 200 ml. of ethyl acetate. The resulting organic layer was washed with 10 ml. of a sodium chloride aqueous solution, dried over sodium sulfate and concentrated leaving a residue which was washed with ether to obtain 105 mg. of 7-(1H-tetrazol-1-yl)acetamido-3-(2-methyl-1,3,4-oxadiazol-5-ylthio)methylceph - 3 - em - 4-carboxylic acid, M.P. 205°–206° C. (decomp.).

UV: $\lambda_{max.}^{phosphate\ buffer\ (pH\ 6.4)}$ 268 m$\mu$ ($E_{1\ cm.}^{1\%}$ 250)

EXAMPLE 27

In the same manner as shown in Example 26, starting from 3-thiolated 7-aminocephalosporanic acids and the appropriate acids, there were obtained:

(a) 7-(4-methyl-1,3-thiazol-2-yl)acetamido - 3 - (2- methyl-1,3,4-oxadiazol-5-ylthio)methylceph - 3 - em - 4-carboxylic acid, M.P. 115°–120° C. (decomp.).

UV: $\lambda_{max.}^{phosphate\ buffer\ (pH\ 6.4)}$ 253 m$\mu$ ($E_{1\ cm.}^{1\%}$ 343)

(b) Dicyclohexylamine salt of 7-(1H-benzotriazol-1-yl)-acetamido-3-(2-methyl-1,3,4-thiadiazol - 5 - ylthio)methylceph-3-em-4-carboxylic acid, M.P. 173°–175° C. (decomp.).

UV: $\lambda_{max.}^{95\%\ C_2H_5OH}$ 279 m$\mu$ ($E_{1\ cm.}^{1\%}$ 253)

(c) 7 - (5 - n - propyl - 1H - tetrazol - 1 - yl)acetamido-3 - (2 - methyl - 1,3,4 - thiadiazol - 5 ylthio)methylceph-3-em-4-carboxylic acid, M.P. 120°–125° C. (decomp.).

UV: $\lambda_{max.}^{phosphate\ buffer\ (pH\ 6.4)}$ 272 m$\mu$ ($E_{1\ cm.}^{1\%}$ 215)

EXAMPLE 28

The reaction mixture prepared by the same procedures as shown in Example 26 was concentrated leaving an oily residue which was dissolved in 20 ml. of water and a small amount of 10% sodium bicarbonate aqueous solution and extracted with ethyl acetate. The resulting aqueous solution was adjusted to pH 2.0 with 10% hydrochloric acid and extracted with 200 ml. of ethyl acetate. Subsequent to washing of the resulting organic layer with a saturated sodium chloride solution and drying over sodium sulfate, the solution was concentrated leaving a residue which was washed with ether to obtain 422 mg. of powders, 7-(3-methyl-1,2-oxazol-5-yl)acetamido-3 - (2 - methyl - 1,3,4 - thiadiazol - 5 - ylthio)methylceph-3-em-4-carboxylic acid, M.P. 153°–169° C. (decomp.).

UV: $\lambda_{max.}^{phosphate\ buffer\ (pH\ 6.4)}$ 272 m$\mu$ ($E_{1\ cm.}^{1\%}$ 248)

EXAMPLE 29

The following and related compounds can be prepared according to the substantially same procedures as shown in Examples 1–28 by selecting the appropriate starting materials:

7-(5-chloro - 2 - thienyl)carbonamido-3-(1-methyl-1H-tetrazol - 5 - ylthio)methylceph-3-em-4-carboxylic acid.

7-(5 - bromo - 2 - thienyl)carbonamido-3-(2-methyl-1,3,4-oxadiazol - 5 - ylthio)methylceph-3-em-4-carboxylic acid.

7-(1 - imidazolyl)carbonamido - 3 - (2-methyl-1,3,4-thiadiazol - 5 - ylthio)methylceph-3-em-4-carboxylic acid.

7-(2 - methyl - 4 - imidazolyl)carbonamido-3-(1-methyl-1H-tetrazol - 5 - ylthio)methylceph-3-em-4-carboxylic acid.

7-(1 - methyl - 5 - imidazolyl)carbonamido-3-(2-methyl - 1,3,4 - oxadiazol - 5 - ylthio)methylceph-3-em-4-carboxylic acid.

7-(1 - imidazolyl)acetamido - 3 - (2 - methyl - 1,3,4-thiadiazol - 5 - ylthio)methylceph3-em-4-carboxylic acid.

7-(2 - phenyl - 4 - imidazolyl)acetamido)-3-(2-methyl-1,3,4 - oxadiazol - 5 - ylthio)methylceph - 3 - em-4-carboxylic acid.

7-(4 - imidazolyl)propionamido - 3 - (1 - methyl - 1H-tetrazol - 5 - ylthio)methylceph-3-em-4-carboxylic acid.

7-(s-triazol - 3 - yl)carbonamido - 3 - (2 - methyl-1,3,4-thiadiazol - 5 - ylthio)methylceph - 3 - em-4-carboxylic acid.

7-(1 - methyl - 1H - 1,2,3 - triazol - 4 - yl)carbonamido-3-(2-methyl - 1,3,4 - oxadiazol - 5 - ylthio)methylceph-3-em-4-carboxylic acid.

7-(5 - methyl - 1 - phenyl - 1H - 1,2,4 - triazol - 3 - yl)carbonamido - 3 - (1-methyl-1H-tetrazol-5-ylthio)methylceph-3-em-4-carboxylic acid.

7-(1 - methyl - 2H - tetrazol - 5 yl)carbonamido-3-(2-methyl - 1,3,4 - thiadiazol - 5 - ylthio)methylceph-3-em-4-carboxylic acid.

7-(5 - ethyl - 1H - tetrazol - 1 - yl)acetamido-3-(2-methyl - 1,3,4 - oxadiazol - 5 - ylthio)methylceph-3-em-4-carboxylic acid.

7-($\alpha$ - methyl - 1H - tetrazol - 1 -yl)acetamido-3-(1-methyl - 1H - tetrazol - 5 - ylthio)methylceph-3-em-4-carboxylic acid.

7-[5 - (1 - naphthyl) - 1H - tetrazol - 1 - yl]acetamido-3-(2 - methyl - 1,3,4 - thiadiazol - 5 - ylthio)methylceph-3-em-4-carboxylic acid.

7-(5 - phenyl - 1H - tetrazol - 1 - yl)acetamido-3-(2-methyl - 1,3,4 - oxadiazol - 5 - ylthio)methylceph-3-em-4-carboxylic acid.

7-(5 - benzyl - 1H - tetrazol - 1 - yl)acetamido-3-(1-methyl - 1H - tetrazol - 5 - ylthio)methylceph-3-em-4-carboxylic acid.

7-(1-butyl-1H-tetrazol - 5 - yl)acetamido-3-(2-methyl-1,3,4-thiadiazol - 5 - ylthio)methylceph-3-em-4-carboxylic acid.

7-($\alpha$-ethyl - 1 - phenyl-1H-tetrazol-5-yl)acetamido-3-(2-methyl-1,3,4-thiadiazol 5 - ylthio)methylceph-3-em-4-carboxylic acid.

7-(1H-tetrazol-5-yl)propionamido - 3 - (1-methyl-1H-tetrazol - 5 - ylthio)methylceph-3-em-4-carboxylic acid.

7-(4-methyl - 2 - thiazolyl)carbonamido-3-(2-methyl-1,3,4-thiadiazol - 5 - ylthio)methylceph-3-em-4-carboxylic acid.

7-(5-phenyl - 4 - thiazolyl)carbonamido-3-(2-methyl-1,3,4-oxadiazol-5-ylthio)methylceph - 3 - em-4-carboxylic acid.

7-(4-methyl - 5 - thiazolyl)carbonamido-3-(1-methyl-1H-tetrazol-5-ylthio)methylceph-3-em-4-carboxylic acid.

7-(2-thiazolyl)acetamido - 3 - (2-methyl-1,2,3,4-thiadiazol - 5 - ylthio)methylceph-3-em-4-carboxylic acid.

7-(4-ethyl-$\beta$,5-dimethyl - 2 - thiazolyl)propionamido-3-(2-methyl-1,3,4-oxadiazol - 5 - ylthio)methylceph-3-em-4-carboxylic acid.

7-(5-thiazolyl)propionamido - 3 - (1-methyl-1H-tetrazol-5-ylthio)methylceph-3-em-4-carboxylic acid.

7-(1,2,3-thiadiazol-4-yl)carbonamido - 3 - (2-methyl-1,3,4-thiadiazol - 5 - ylthio)methylceph-3-em-4-carboxylic acid.

7-(1,3,4-thiadiazol - 2 - yl)carbonamido-3-(2-methyl-1,3,4-thiadiazolylthio)methylceph - 3 - em-4-carboxylic acid.

7-(5-oxazolyl)carbonamido - 3 - (1-methyl-1H-tetrazol-5-ylthio)methylceph-3-em-4-carboxylic acid.

7-(4-methyl-5-oxazolyl)acetamido - 3 - (2-methyl-1,3,4-thiadiazol - 5 - ylthio)methylceph-3-em-4-carboxylic acid.

7-(3-methyl - 5 - isoxazolyl)acetamido-3-(2-methyl-1,3,4-oxadiazol - 5 - ylthio)methylceph-3-em-4-carboxylic acid.

7-(5-methyl-1,2,4-oxadiazol - 3 - yl)carbonamido-3-(1-methyl-1H-tetrazol - 3 - ylthio)methylceph-3-em-4-carboxylic acid.

7-(1,2,4-oxadiazol - 5 - yl)propionamido-3-(2-methyl-1,3,4-thiadiazol - 5 - ylthio)methylceph-3-em-4-carboxylic acid.

7-(2-pyridyl)acetamido - 3 - (2-methyl-1,3,4-oxadiazol-5-ylthio)methylceph-3-em-4-carboxylic acid.

7-(4-pyridyl)acetamido - 3 - (1-methyl-1H-tetrazol-5-ylthio)methylceph-3-em-4-carboxylic acid.

7-picolinamido-3-(2-methyl - 1,3,4-thiadiazol-5-ylthio)-methylceph-3-em-4-carboxylic acid.

7-(5-ethoxynicotinamido) - 3 - (2-methyl-1,3,4-oxadiazol-5-ylthio)methylceph-3-em-4-carboxylic acid.

7-nicotinamido-3-(1-methyl - 1H - tetrazol-5-ylthio)-methylceph-3-em-4-carboxylic acid.

7-(3-chloroisonicotinamido) - 3 - (2-methyl-1,3,4-thiadiazol - 5 - ylthio)methylceph-3-em-4-carboxylic acid.

7-(2-pyrimidinyl)acetamido - 3 - (2-methyl-1,3,4-oxadiazol-5-ylthio)methylceph-3-em-4-carboxylic acid.

7-(6-nitro-2-benzothiazolyl)carbonamido - 3 - (1-methyl-1H-tetrazol - 5 - ylthio)methylceph-3-em-4-carboxylic acid.

7-(5-nitro-1-benzimidazolyl)acetamido - 3 - (2-methyl-1,3,4-thiadiazol - 5 - ylthio)methylceph-3-em-4-carboxylic acid.

7-(2-benzoxazolyl)acetamido - 3 - (2-methyl-1,3,4-oxadiazol - 5 - ylthio)methylceph-3-em-4-carboxylic acid.

7-(α′,α-dimethyl - 1H - benzotriazol-1-yl-carbonamido-3-(1-methyl-1H-tetrazol - 5 - ylthio)methylceph-3-em-4-carboxylic acid.

In accordance with the substantially same procedure as in the above-mentioned and illustrated examples, there can also be prepared the object compounds of Formula I which have the following 3-thiolated methyl groups:

imidazol-2-ylthiomethyl,
s-triazol-3-ylthiomethyl,
5-methyl-s-triazol-3-ylthiomethyl,
1H-1,2,4-triazol-5-ylthiomethyl,
3-methyl-1-phenyl-1H-1,2,4-triazol-5-ylthiomethyl,
4,5-dimethyl-4H-1,2,4-triazol-3-ylthiomethyl,
4-phenyl-4H-1,2,4-triazol-3-ylthiomethyl,
1H-tetrazol-5-ylthiomethyl,
1-methyl-1H-tetrazol-5-ylthiomethyl,
1-ethyl-1H-tetrazol-5-ylthiomethyl,
1-n-propyl-1H-tetrazol-5-ylthiomethyl,
1-phenyl-1H-tetrazol-5-ylthiomethyl,
1-p-chlorophenyl-1H-tetrazol-5-ylthiomethyl,
2-thiazolylthiomethyl,
4-(2-thienyl)-2-thiazolylthiomethyl,
4,5-dimethyl-2-thiazolylthiomethyl,
1,3,4-thiadiazol-5-ylthiomethyl,
2-methyl-1,3,4-thiadiazol-5-ylthiomethyl,
2-ethyl-1,3,4-thiadiazol-5-ylthiomethyl,
2-n-propyl-1,3,4-thiadiazol-5-ylthiomethyl,
2-isopropyl-1,3,4-thiadiazol-5-ylthiomethyl,
5-thiatriazolylthiomethyl,
5-oxazolylthiomethyl,
4-methyl-5-oxazolylthiomethyl,
2-oxazolylthiomethyl,
4,5-diphenyl-2-oxazolylthiomethyl,
3-methyl-5-isoxazolylthiomethyl,
1,2,4-oxadiazol-5-ylthiomethyl,
5-methyl-1,3,4-oxadiazol-2-ylthiomethyl,
5-phenyl-1,3,4-oxadiazol-5-ylthiomethyl,
5-p-nitrophenyl-1,3,4-oxadiazol-2-ylthiomethyl,
2-(2-thienyl)-1,3,4-oxadiazol-5-ylthiomethyl,
2-benzimidazolylthiomethyl,
5-chloro-2-benzimidazolylthiomethyl,
2-benzoxazolylthiomethyl,
5-nitro-2-benzoxazolylthiomethyl,
5-chloro-2-benzoxazolylthiomethyl,
s-triazolo[4,3-a]pyrid-3-ylthiomethyl,
v-triazolo[4,5-b]pyrid-6-ylthiomethyl,
purin-2-ylthiomethyl,
purin-6-ylthiomethyl,
8-chloro-2-methylpurin-6-ylthiomethyl
and the like.

In accordance with the procedures of the above-mentioned and illustrated examples, there can also be prepared the desired compounds of Formula I which have the following 7-acylamino groups:

2-thienyl(thio)carbonamido,
5-chloro-2-thienyl(thio)carbonamido,
2-imidazolyl(thio)carbonamido,
3-triazol-3-yl(thio)carbonamido,
1H-1,2,4-triazol-5-yl(thio)carbonamido,
4-methyl-4H-1,2,4-triazol-3-yl(thio)carbonamido,
1H-tetrazol-5-yl(thio)carbonamido,
2-thiazolyl(thio)carbonamido,
1,3,4-thiadiazol-5-yl(thio)carbonamido,
2-methyl-1,3,4-thiadiazol-5-yl(thio)carbonamido,
2-ethyl-1,3,4-thiadiazol-5-yl(thio)carbonamido,
2-oxazolyl(thio)carbonamido,
1,3,4-oxadiazol-2-yl(thio)carbonamido
2-benzothiazolyl(thio)carbonamido,
2-benzimidazolyl(thio)carbonamido,
5-chloro-2-benzoxazolyl(thio)carbonamido,
3-pyridyl(thio)carbonamido,
4-pyridyl(thio)carbonamido,
4-pyrimidinyl(thio)carbonamido,
v-triazolo[4,5-b]pyrid-6-yl(thio)carbonamido,
2-thienyl(thio)acetamido,
5-chloro-2-thienyl(thio)acetamido,
2-imidazolyl(thio)acetamido,
s-triazol-3-yl(thio)acetamido,
5-methyl-s-triazol-3-yl(thio)acetamido,
1H-1,2,4-triazol-5-yl(thio)acetamido,
α-methyl-1H-1,2,4-triazol-5-yl(thio)acetamido,
3-methyl-1-phenyl-1H-1,2,4-triazol-5-yl(thio)acetamido,
4,5-dimethyl-4H-1,2,4-triazol-3-yl(thio)acetamido,
4-phenyl-4H-1,2,4-triazol-3-yl(thio)acetamido,
1H-tetrazol-5-yl(thio)acetamido,
α-methyl-1H-tetrazol-5-yl(thio)acetamido,
1-methyl-1H-tetrazol-5-yl(thio)acetamido,
α-ethyl-1H-tetrazol-5-yl(thio)acetamido,
1-ethyl-1H-tetrazol-5-yl(thio)acetamido,
1-n-propyl-1H-tetrazol-5-yl(thio)acetamido,
1-phenyl-1H-tetrazol-5-yl(thio)acetamido,
1-p-chlorophenyl-1H-tetrazol-5-yl(thio)acetamido,
2-thiazolyl(thio)acetamido,
4,5-dimethyl-2-thiazolyl(thio)acetamido,
1,3,4-thiadiazol-2-yl(thio)acetamido,
2-methyl-1,3,4-thiadiazol-5-yl(thio)acetamido,
α,2-dimethyl-1,3,4-thiadiazol-5-yl(thio)acetamido,
α-ethyl-2-methyl-1,3,4-thiadiazol-5-yl(thio)acetamido,
2-ethyl-1,3,4-thiadiazol-5-yl(thio)acetamido,
2-n-propyl-1,3,4-thiadiazol-5-yl(thio)acetamido,
2-isopropyl-1,3,4-thiadiazol-5-yl(thio)acetamido,
5-thiatriazolyl(thio)acetamido,
4-methyl-5-oxazolyl(thio)acetamido,
2-oxazolyl(thio)acetamido,
4,5-diphenyl-2-oxazolyl(thio)acetamido,
3-methyl-5-isoxazolyl(thio)acetamido,
1,2,4-oxadiazol-5-yl(thio)acetamido,
5-methyl-1,3,4-oxadiazol-2-yl(thio)acetamido,
5-phenyl-1,3,4-oxadiazol-2-yl(thio)acetamido,
5-p-chlorophenyl-1,3,4-oxadiazol-5-yl(thio)acetamido,
2-(2-thienyl)-1,3,4-oxadiazol-5-yl(thio)acetamido,
2-pyridyl(thio)acetamido,
3-methyl-4-pyridyl(thio)acetamido,
2-pyrimidinyl(thio)acetamido,
5-methyl-2-pyrimidinyl(thio)acetamido,
2-benzothiazolyl(thio)acetamido,
5-chloro-2-benzothiazolyl(thio)acetamido,
2-benzimidazolyl(thio)acetamido,
5-nitro-2-benzimidazolyl(thio)acetamido,
2-benzoxazolyl(thio)acetamido,
5-chloro-2-benzoxazolyl(thio)acetamido,
5-nitro-2-benzoxazolyl(thio)acetamido,
1H-benzotriazol-1-ylacetamido,
5-(2-furyl)-1H-tetrazol-1-yl(thio)acetamido,
5-(3-methyl-5-isoxazolyl)-1H-tetrazol-1-yl(thio)acetamido,
2-thienyl(thio)propionamido,
2-imidazolyl(thio)propionamido,
s-triazol-3-yl(thio)propionamido,
4H-t,2,4-triazol-3-yl(thio)propionamido,
1H-tetrazol-5-yl(thio)propionamido,
1-methyl-1H-tetrazol-5-yl(thio)propionamido,
5-methyl-1H-tetrazol-1-yl(thio)propionamido,
2-thiazolyl(thio)propionamido,
3-methyl-1,2,4-thiadiazol-5-yl(thio)propionamido,
5-phenyl-1,3,4-thiadiazol-2-yl(thio)propionamido,
α-methyl-1,3,4-thiadiazol-2-yl(thio)propionamido,
5-thiatriazolyl(thio)propionamido,
2-oxazolyl(thio)propionamido,
1,3,4-oxadiazol-2-yl(thio)propionamido,
5-methyl-1,3,4-oxadiazol-2-yl(thio)propionamido,
2-benzoxazolyl(thio)propionamido,
5-nitro-2-benzoxazolyl(thio)propionamido,
2-benzimidazolyl(thio)propionamido,
2-benzothiazolyl(thio)propionamido,
1H-benzotriazol-1-ylpropionamido,
2-pyridyl(thio)propionamido,
α-ethyl-4-pyridyl(thio)propionamido,
4-pyridyl(thio)propionamido, 2-pyrimidinyl(thio)propionamido,
4-pyrimidinyl(thio)propionamido,
2-thienyl(thio)butanamido,
5-chloro-2-thienyl(thio)butanamido,
2-imidazolyl(thio)butanamido,
1H-1,2,4-triazol-5-yl(thio)butanamido,
4H-1,2,4-triazol-3-yl(thio)butanamido,
1H-tetrazol-5-yl(thio)butanamido,
1-methyl-1H-tetrazol-5-yl(thio)butanamido,
5-methyl-1H-tetrazol-1-yl(thio)butanamido,
2-thiazolyl(thio)butanamido,
1,3,4-thiadiazol-2-yl(thio)butanamido,
5-methyl-1,3,4-thiadiazol-2-yl(thio)butanamido,
2-oxazolyl(thio)butanamido,
3-phenyl-1,2,4-oxadiazol-5-yl(thio)butanamido,
1,3,4-oxadiazol-2-yl(thio)butanamido,
5-methyl-1,3,4-oxadiazol-2-yl(thio)butanamido,
2-pyridyl(thio)butanamido,
4-pyridyl(thio)butanamido,
2-pyrimidinyl(thio)butanamido,
2-benzothiazolyl(thio)butanamido,
γ-methyl-2-benzoxazolyl(thio)butanamido,
5-chloro-2-benzoxazolyl(thio)butanamido,
2-benzimidazolyl(thio)butanamido,
6-nitro-2-benzimidazolyl(thio)butanamido
and the like.

What we claim is:

1. A compound selected from the group consisting of compounds of the formula $$R^1-CONH-CH-CH\underset{CO-N}{\overset{S}{\diagup}}\underset{\underset{COOH}{C}}{\overset{CH_2}{\diagdown}}C-CH_2-S-R^2$$

in which $R^1$ is a member selected from the group consisting of $R^3-(Alk)_m-$ and $R^3-S-(Alk)_m-$ wherein $R^3$ is thienyl, diazolyl, triazolyl, tetrazolyl, thiazolyl, thiadiazolyl, thiatriazolyl, oxazolyl, oxadiazolyl, pyridyl, pyrimidinyl, benzothiazolyl, benzimidazolyl, benzoxazolyl or benzotriazolyl, $m$ is zero or one, and Alk is alkylene having a straight or branched chain, and $R^2$ is diazolyl, triazolyl, tetrazolyl, thiazolyl, thiadiazolyl, thiatriazolyl, oxazolyl, oxadiazolyl, benzimidazolyl, benzoxazolyl, triazolopyridyl or purinyl, and their pharmaceutically acceptable salts.

2. A compound in accordance with claim 1 wherein $R^1$ is thienyl-2-methyl and $R^2$ is 1,3,4-thiadiazol-5-yl.

3. A compound in accordance with claim 1 wherein $R^1$ is thienyl-2-methyl and $R^2$ is 2-methyl-1,3,4-thiadiazol-5-yl.

4. A compound in accordance with claim 1 wherein $R^1$ is thienyl-2-methyl and $R^2$ is 2-ethyl-1,3,4-thiadiazol-5-yl.

5. A compound in accordance with claim 1 wherein $R^1$ is thienyl-2-methyl and $R^2$ is 1-methyl-1H-tetrazol-5-yl.

6. A compound in accordance with claim 1 wherein $R^1$ is thienyl-2-methyl and $R^2$ is 1-ethyl-1H-tetrazol-5-yl.

7. A compound in accordance with claim 1 wherein $R^1$ is thienyl-2-methyl and $R^2$ is 1-isopropyl-1H-tetrazol-5-yl.

8. A compound in accordance with claim 1 wherein $R^1$ is 1H-tetrazol-1-yl-methyl and $R^2$ is 1,3,4-thiadiazol-2-yl.

9. A compound in accordance with claim 1 wherein $R^1$ is 1H-tetrazol-1-yl-methyl and $R^2$ is 2-methyl-1,3,4-thiadiazol-5-yl.

10. A compound in accordance with claim 1 wherein $R^1$ is 1H-tetrazol-1-yl-methyl and $R^2$ is 2-ethyl-1,3,4-thiadiazol-5-yl.

11. A compound in accordance with claim 1 wherein $R^1$ is 1H-tetrazol-1-yl-methyl and $R^2$ is 1-methyl-1H-tetrazol-5-yl.

12. A compound in accordance with claim 1 wherein $R^1$ is 1H-tetrazol-1-yl-methyl and $R^2$ is 1-ethyl-1H-tetrazol-5-yl.

13. A compound in accordance with claim 1 wherein $R^1$ is 1-methyl-1H-tetrazol-5-ylmethyl and $R^2$ is 2-methyl-1,3,4-thiadiazol-5-yl.

14. A compound in accordance with claim 1 wherein $R^1$ is 1-methyl-1H-tetrazol-5-ylmethyl and $R^2$ is 1-methyl-1H-tetrazol-5-yl.

15. A compound in accordance with claim 1 wherein $R^1$ is 1-methyl-1H-tetrazol-5-ylmethyl and $R^2$ is 1-ethyl-1H-tetrazol-5-yl.

16. A compound in accordance with claim 1 wherein $R^1$ is 1,3,4-thiadiazol-2-ylthiomethyl and $R^2$ is 1-methyl-1H-tetrazol-5-yl.

17. A compound in accordance with claim 1 wherein $R^1$ is 1,3,4-thiadiazol-2-ylthiomethyl and $R^2$ is 1-ethyl-1H-tetrazol-5-yl.

18. A compound in accordance with claim 1 wherein $R^1$ is 1,3,4-thiadiazol-5-ylthiomethyl and $R^2$ is 2-methyl-1,3,4-thiadiazol-5-yl.

19. A compound in accordance with claim 1 wherein $R^1$ is 2-methyl-1,3,4-thiadiazol-5-ylthiomethyl and $R^2$ is 2-methyl-1,3,4-thiadiazol-5-yl.

20. A compound in accordance with claim 1 wherein $R^1$ is 2-methyl-1,3,4-thiadiazol-5-ylthiomethyl and $R^2$ is 1-methyl-1H-tetrazol-5-yl.

21. A compound in accordance with claim 1 wherein $R^1$ is 2-methyl-1,3,4-oxadiazol-5-ylthiomethyl and $R^2$ is 2-methyl-1,3,4-thiadiazol-5-yl.

22. A compound in accordance with claim 1 wherein $R^1$ is 2-methyl-1,3,4-oxadiazol-5-ylthiomethyl and $R^2$ is 1-methyl-1H-tetrazol-5-yl.

23. A compound in accordance with claim 1 wherein $R^1$ is 2-methyl-1,3,4-oxadiazol-5-ylthiomethyl and $R^2$ is 1-ethyl-1H-tetrazol-5-yl.

24. A compound in accordance with claim 1 wherein $R^1$ is 4-pyridylthiomethyl and $R^2$ is 1-methyl-1H-tetrazol-5-yl.

References Cited

UNITED STATES PATENTS

| | | |
|---|---|---|
| 3,278,531 | 10/1966 | Cox. |
| 3,239,515 | 3/1966 | Van Heyningen. |
| 3,239,516 | 3/1966 | Van Heyningen. |
| 3,365,449 | 1/1968 | Takano et al. |

NICHOLAS S. RIZZO, Primary Examiner

U.S. Cl. X.R.

424—246

PO-1050
(5/69)

UNITED STATES PATENT OFFICE
CERTIFICATE OF CORRECTION

Patent No. 3,516,997          Dated June 23, 1970

Inventor(s) Tadayoshi Takano et al.

It is certified that error appears in the above-identified patent and that said Letters Patent are hereby corrected as shown below:

Column 2, line 44, "respectviely" should read --respectively--; Column 2, line 66, "Preparation" should read --Preparations--; Column 3, line 25, "bicarbnate" should read --bicarbonate--; Column 4, line 41, "wtih" should read --with--; Column 4, line 45, "chromatorgaphy" should read --chromatography--; Column 4, line 55 "prepaartions" should read --preparations--; Column 5, line 53 "adpjusted" should read --adjusted--;

Column 6, line 27 "methylcepth" should read --methylceph--; Column 6, line 34 "methylcepth" should read --methylceph--; Column 10, line 75 "max." should read --inf.--; Column 11, line 26, "203" should read --252--; Column 11, line 31, "252" should read --203--;

Column 12, line 23, "max." should read --inf.--; Column 13, line 10, "max." should read --inf.--; Column 15, line 15, "(pH 6.4)" should read --(pH 6.5)--; Column 16, line 28 "(2-methyl-1,2,3,4" should read --(2-methyl-1,3,4--.

SIGNED AND
SEALED

JAN 5 1971

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,516,997    Dated June 23, 1970

Inventor(s) Tadayoshi Takano et al.

It is certified that error appears in the above-identified patent and that said Letters Patent are hereby corrected as shown below:

Column 1, line 29, "aceptable" should read --acceptable--;

Column 1, lines 40-65 inclusive, including structural formula (II), should be inserted in column 2 after line 20. Formula (II) That portion of the formula reading

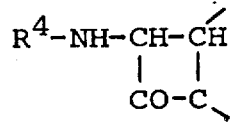

should be changed to read

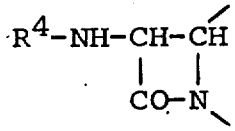

Column 5, line 63, "reduce" should read --reduced--;

Column 11, line 40, "methyl-ceph" should read --methylceph--.

Signed and sealed this 30th day of March 1971.

(SEAL)
Attest:

EDWARD M. FLETCHER, JR.
Attesting Officer

WILLIAM E. SCHUYLER, JR.
Commissioner of Patents